(12) United States Patent
Fleming et al.

(10) Patent No.: US 6,807,353 B1
(45) Date of Patent: Oct. 19, 2004

(54) MICROFABRICATED BRAGG WAVEGUIDE

(75) Inventors: James G. Fleming, Albuquerque, NM (US); Shawn-Yu Lin, Albuquerque, NM (US); G. Ronald Hadley, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 163 days.

(21) Appl. No.: 10/025,447

(22) Filed: Dec. 19, 2001

(51) Int. Cl.[7] ................................................ G02B 6/00
(52) U.S. Cl. ...................... 385/132; 385/129; 385/130; 385/131
(58) Field of Search ................................ 385/129, 130, 385/131, 132, 14

(56) References Cited

U.S. PATENT DOCUMENTS 5,892,861 A * 4/1999 Le Febre ..................... 385/12
6,215,947 B1 * 4/2001 Abramowicz et al. ...... 385/143
2003/0035613 A1 * 2/2003 Huber et al. .................. 385/16

* cited by examiner

Primary Examiner—Akm Enayet Ullah
Assistant Examiner—Sung Pak
(74) Attorney, Agent, or Firm—Kevin W. Bieg (57) ABSTRACT

A microfabricated Bragg waveguide of semiconductor-compatible material having a hollow core and a multilayer dielectric cladding can be fabricated by integrated circuit technologies. The microfabricated Bragg waveguide can comprise a hollow channel waveguide or a hollow fiber. The Bragg fiber can be fabricated by coating a sacrificial mandrel or mold with alternating layers of high- and low-refractive-index dielectric materials and then removing the mandrel or mold to leave a hollow tube with a multilayer dielectric cladding. The Bragg channel waveguide can be fabricated by forming a trench embedded in a substrate and coating the inner wall of the trench with a multilayer dielectric cladding. The thicknesses of the alternating layers can be selected to satisfy the condition for minimum radiation loss of the guided wave.

37 Claims, 8 Drawing Sheets

MICROFABRICATED BRAGG WAVEGUIDE

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

This invention relates to optical waveguides and, more particularly, to hollow waveguides based on optical confinement by Bragg reflection that are fabricated with integrated circuit (IC) technology.

Waveguiding of light is typically based on refractive index contrast for optical confinement. For example, the vast majority of optical fibers are dielectric fibers comprising a core of high refractive index material surrounded by a cladding of lower index material whereby light is guided within the fiber by total internal reflection of the guided light at the core-clad interface. In particular, silica-core fibers are ideal for propagation of telecommunications signals at the near-infrared absorption minimum of silica.

Conventional dielectric fibers can have disadvantages for specialized applications. Fiber attenuation can result from absorption and scattering of the guided light by the core material. Silica and most other materials become highly absorbing at longer wavelengths, limiting the far-infrared transmission through most solid-core fibers. Furthermore, Rayleigh scattering in solid core materials increases rapidly at shorter wavelengths. Dielectric fibers typically have small core-clad refractive index contrast and consequent large critical angle for total internal reflection. As a result, dielectric fibers can suffer large bending losses when the angle at which the light hits the core-clad interface falls within the critical angle at small bending radii. Thus, conventional dielectric fibers cannot bend light around sharp turns, important for optical integrated circuits and other microphotonic applications. The refractive index contrast of the waveguide can be improved with higher index semiconductor core materials, enabling tighter bending radii. However, it becomes more difficult to effectively couple light into the waveguide when the refractive index of the core material is increased. This coupling problem can make the assembly and packaging of integrated microphotonic systems difficult.

Recently, interest has grown in hollow- and liquid-core waveguides, primarily for medical and industrial applications. With hollow-core waveguides, the solid core is replaced by a non-absorbing gas or vacuum. The cladding material generally has a refractive index greater than the core material such that the wave is guided by reflections at the core-clad interface. Attenuation due to core material absorption can be low and such hollow waveguides can have large damage thresholds and high power capacities due to the absence of a core material. Furthermore, hollow waveguides can have low insertion loss, since end reflections from a solid core are eliminated.

However, metal-clad hollow waveguides, in particular, can be leaky due to imperfect wall reflectivity resulting from absorption and diffuse scattering by the metal clad at infrared and visible wavelengths. Scattering due to surface roughness is further accentuated because reflections are at near-grazing incidence. Multiple imperfect reflections can result in large transmission losses, thereby favoring large cross-section hollow waveguides. Likewise, hollow waveguides can suffer large bending losses due to mode coupling and the increased number of reflections off of the outer and inner walls of the waveguide with tight bends. It has been observed that the reflectivity of metal-clad hollow waveguides can be improved by coating the internal metallic guide surface with a thin, less-conductive dielectric cladding layer. However, only relatively large dielectric-coated metal hollow waveguides have been fabricated. Furthermore, such dielectric-coated metal waveguides can still suffer relatively large bending losses and transmission losses due to interaction of the guided wave with the underlying metallic layer. Harrington et al. "Review of hollow waveguide technology," SPIE 2396, 4 (1995).

Bragg fibers, built on the principle of the cylindrical multilayer dielectric mirror, have been proposed for low loss broadband guiding of light in air. Analysis has shown that confined modes can exist in a Bragg fiber comprising a low-index core (for example, air) surrounded by a cladding of alternating high- and low-refractive-index layers. Yeh et al. "Theory of Bragg Fiber," J. Opt. Soc. Am. 68, 1196 (1978). These Bragg fibers are predicted to have low transmission loss and can have a large single mode volume. Recently, the theory of the Bragg fiber has been extended to include omnidirectional waveguides that exhibit strong reflectivity over a range of incident angles with appropriate choice of dielectric layers, allowing for guiding light around sharp bends. Fink et al. "A Dielectric Omnidirectional Reflector," Science 282, 1679 (1998).

Waveguiding in a Bragg fiber comprising alternating thin layers of polymer and tellurium on the inside of a rubber tube has recently been demonstrated. Fink et al. "Guiding Optical Light in Air Using an All-Dielectric Structure," J. Lightwave Tech. 17, 2039 (1999). This large diameter Bragg fiber exhibited strong omnidirectional reflectivity and good transmission around a relatively small radius bend for guided light in the wavelength range of 10 to 15 micrometers. However, the Bragg fiber described by Fink et al. is not fabricated using IC technologies and, therefore, does not use semiconductor-compatible materials and is limited to guiding longer wavelength light.

Bragg waveguides, with multilayer dielectric cladding, may be attractive for microphotonic applications. However, a need remains for small diameter Bragg waveguide that can transmit light at wavelengths of use with optical integrated circuits and that can be fabricated with semiconductor-compatible technologies and materials.

The present invention comprises a microfabricated Bragg waveguide and a method for fabricating the Bragg waveguide. The microfabricated Bragg waveguide has a number of attractive features for use in microphotonics applications. It is designed to allow modest radiation losses for both TE and TM polarizations, thus leading to a waveguide of general utility. The increase in the mode size and low insertion loss afforded by the propagation of light in air may greatly improve coupling efficiency to optical components, a critical issue for integrated microphotonics. Coupling may also be improved resulting from the absence end reflections, which can be a difficulty with silica fibers requiring highly polished end facets. Light propagation in an air-core waveguide may also reduce some material dispersion effects that are inherent with solid-core fibers. The microfabricated Bragg waveguide of the present invention can be fabricated with IC technologies using semiconductor-compatible materials. This enables material and fabrication flexibilities not possible with prior art Bragg fibers. For example, the microfabricated Bragg waveguides can have arbitrary cross-section and very small core size. The small core size enables guided waves with only a few modes. The reduced size further enables integration with microelectromechanical systems (MEMS) actuation schemes and smaller and less complex optical integrated circuits.

SUMMARY OF THE INVENTION

The present invention provides a microfabricated Bragg waveguide of semiconductor-compatible materials. The microfabricated Bragg waveguide can be a channel or fiber having a hollow core for the propagation of an optical guided wave therein. The Bragg waveguide further comprises a multilayer dielectric cladding disposed on at least one wall of the fiber or the inner wall of the channel, the cladding comprising at least one alternating layers of a first semiconductor-compatible dielectric material having a high index of refraction and a second semiconductor-compatible dielectric material having a lower index of refraction, such that the thicknesses of the alternating layers are carefully chosen to minimize radiation loss.

The present invention further comprises a method for fabricating a Bragg channel waveguide, comprising coating a top surface of a substrate with a mask layer of a structural material, forming an opening in the structural mask layer, etching a trench in the substrate through the opening in the structural mask layer, and coating the inner wall of the trench with a multilayer dielectric cladding.

The present invention further provides a method for fabricating a Bragg fiber, comprising forming a trench in a substrate, coating the inner wall of the trench with a first layer of a structural material, filling the structural material-lined trench with a sacrificial material to leave an exposed deposit surface, coating the deposit surface of the sacrificial material with a second layer of the structural material, removing the sacrificial material to leave a hollow fiber in the trench, removing the substrate to leave a hollow fiber of the structural material, and coating at least one wall of the hollow fiber with a multilayer dielectric cladding.

Alternatively, the Bragg fiber can be fabricated by forming a mandrel of a sacrificial material, coating the surface of the mandrel with a multilayer dielectric cladding, and removing the sacrificial material to leave a hollow tube of the multilayer dielectric cladding.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

FIG. 1 shows a schematic illustration of a one-dimensional (1D) waveguide.

FIG. 2 shows field distributions for a plane electromagnetic wave propagating in a 1D Bragg waveguide with a multilayer dielectric cladding.

FIG. 6 shows a scanning electron micrograph (SEM) of a Bragg channel waveguide in a silicon substrate having a Si/SiN multilayer cladding designed to guide light with a wavelength of 1.55 µm.

DETAILED DESCRIPTION OF THE INVENTION

Figure 1A:
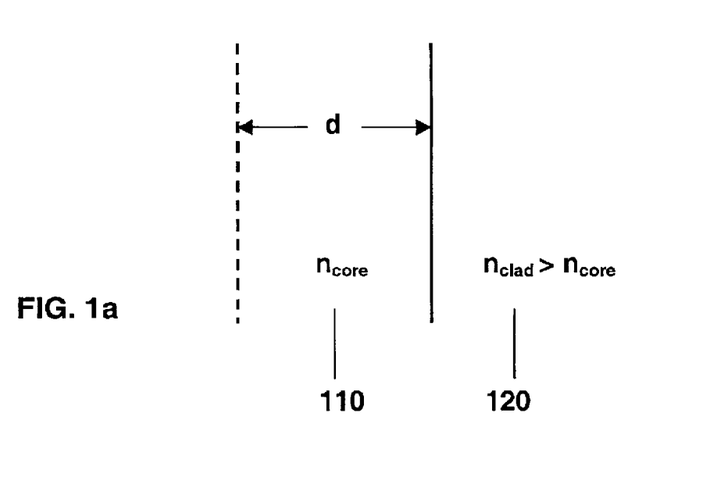
FIG. 1a shows a 1D waveguide comprising a low-refractive-index core and a higher index clad.

FIG. 1a shows a schematic illustration of a 1D waveguide comprising a core 110, with refractive index $n_{core}$, surrounded by a clad 120, with a higher refractive index $n_{clad}$. For the case wherein the wavelength λ of the guided wave is much smaller than the separation $2d$ between the cladding plates 120, Nishihara et al. derived the following analytical expressions for the attenuation α of the transverse electric (TE) and transverse magnetic (TM) modes in a 1D waveguide with air as the core material:

$$\alpha = m^2\lambda^2 Re(1/(v^2-1)^{1/2})/16d^3$$

for $TE_m$ modes, and $$\alpha = m^2\lambda^2 Re(v^2/(v^2-1)^{1/2})/16d^3$$

for $TM_m$ modes where m is the mode number and v is the complex index of refraction of the clad material. H. Nishihara et al. "Low-loss parallel-plate waveguide at 10.6 µm," Appl. Phys. Lett. 25, 391 (1974). These expressions show that the attenuation is proportional to the squares of the mode number and the wavelength of the guided light. In general, losses increase rapidly with smaller waveguides, as the attenuation is inversely proportional to the cube of the clad separation. As a result, most metal-clad hollow waveguides have diameters of order 1 mm or larger. TE modes are seen to have less attenuation than TM modes with the same mode number, because $v^2 > 1$. For light of wavelength 1.55 µm propagating in a simple 1D silicon-clad hollow waveguide with air as the core 110, silicon as the clad 120, and a 10 µm separation distance, the propagation losses for the lowest order mode range from 30 dB/cm for the TE mode, to 340 dB/cm for the TM mode. Losses of this magnitude make this simple waveguide impractical for most applications.

These losses can be reduced by coating the clad 120 with a multilayer dielectric cladding 100, comprising alternating layers of high- and low-refractive index dielectric materials, wherein the cladding layer thicknesses are carefully chosen so that multiple reflections of rays reentering the core 110 add constructively and those constituting radiation loss to the clad 120 approximately cancel.

Figure 1B:
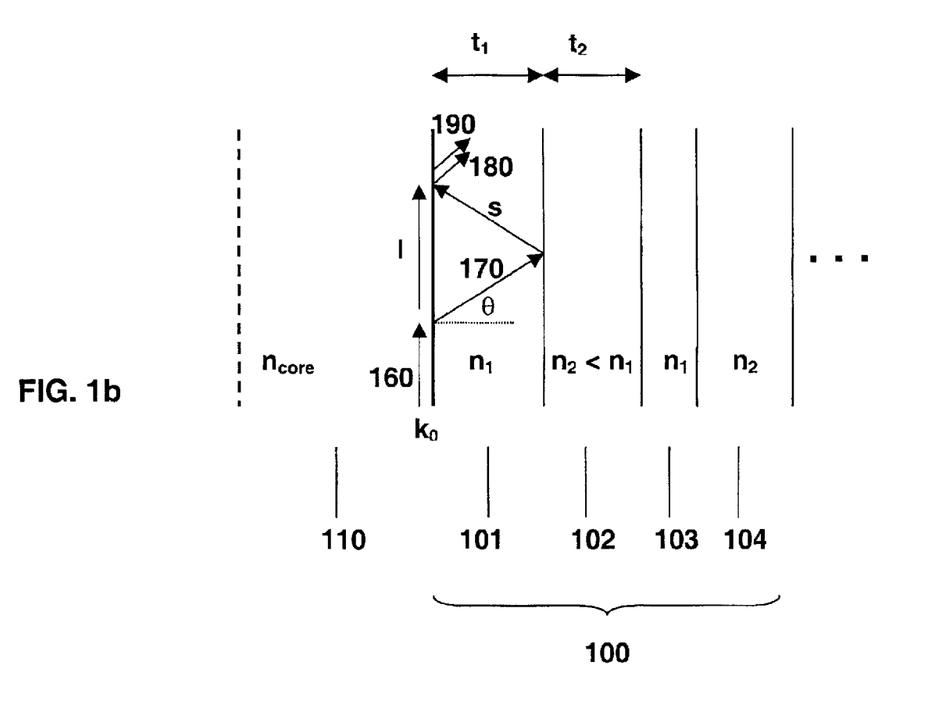
FIG. 1b illustrates a ray of light undergoing multiple reflections while propagating in a multilayer dielectric cladding of a 1D Bragg waveguide.

FIG. 1b shows a multilayer dielectric cladding 100 comprising a first cladding layer 101 of first dielectric material, having a refractive index $n_1$ and thickness $t_1$, and a second cladding layer 102 of second dielectric material, having a lower refractive index $n_2$ and thickness $t_2$. The multilayer dielectric cladding 100 can further comprise alternating interior cladding layers of the high-index dielectric material 103 and the low-index dielectric material 104. Consider a guided ray 160 with wavenumber $k_0$ propagating in the hollow core 110 that impinges on the surface of the first cladding layer 101 at glancing incidence (because of the core diameter being many wavelengths in size). A refracted ray 170 is launched in the first cladding layer 101 at a critical angle θ. The refracted ray 170 subsequently undergoes two reflections, one from the low-index second cladding layer 102 and one at the core interface, generating the outgoing ray 180. Leakage of the guided ray 160 from the core 110 will be a minimum when this outgoing ray 180 and the refracted ray 190 resulting from that portion of the guided ray 160 that propagates a further distance 1 down the core 110, interfere destructively. Equalizing the optical paths of the guided 160 and refracted 170 rays, the condition for destructive interference of the radiated rays 180, 190 is given by:

$$k_0 l = 2k_0 n_1 s + j\pi + (2N+1)\pi$$

where N is an arbitrary integer, $k_0$ is the propagation constant $2\pi/\lambda_0$, and j accounts for the phase shift of $\pi$ radians that may occur as a result of the two reflections described above. J. D. Jackson, *Classical Electrodynamics,* John Wiley and Sons, Inc., NY, pp219–220 (1962). This same equation applies to radiation propagating outwards in each of the other cladding layers of the multilayer dielectric cladding 100, provided that the parameters N and j are correctly chosen. The result is an equation for the optimum thickness t of each cladding layer.

For TE-polarized light, no net phase shift occurs, and we take N=−1 so that all layer thicknesses are predicted to be one-quarter of the wavelength of light in the respective layer (a so-called quarter wave stack). This corresponds to the stack design employed by Fink et al. cited above and is near-optimum for TE polarization. However, for TM-polarized light there is an extra phase shift at the core interface reflection so that we must take j=1 and the predicted layer thickness of the first cladding layer 101 is one-half wave. Therefore the optimum thickness for the first cladding layer 101 is different for different polarizations. But the common case of linear polarization will result in light interaction at the waveguide boundary that is TE-like at two opposite sides and TM-like at the other two. Thus, a waveguide design that is highly lossy for either polarization will be lossy for linear polarization, and thus will be of limited usefulness. It can be shown that the stack design consisting of quarter-wave thicknesses throughout is highly lossy for TM polarization, and so is unsuitable for many microphotonic applications. The modified stack design wherein the first cladding layer 101 is half-wave experiences modest losses for TE polarization (and of course very low loss for TM polarization). If the thickness of the first cladding layer 101 is slightly below the half-wave thickness, the TE loss is seen to decrease dramatically with only a modest increase in TM loss. The above condition for destructive interference will provide cladding layer thicknesses that result in a good overall stack design, resulting in a waveguide that works well at all polarizations, and is an important feature of the present invention. Stack designs for minimum radiation loss for waveguides of arbitrary cross-section can be obtained using the above principles with numerical models that are known to those in the optical design art.

For a microfabricated Bragg waveguide, the cladding layers can be made of silicon-based materials that have sufficiently high refractive index contrast for good optical confinement and are compatible with silicon integrated circuit processing technologies. These silicon-based materials comprise, for example, silicon nitride (SiN), polycrystalline silicon (poly-Si), silicon dioxide ($SiO_2$), silicon oxynitrides ($SiO_xN_y$), and silicon carbide (SiC).

As an example of the present invention, consider a guided wave of wavelength λ=1.55 μm propagating in a Bragg waveguide having a $Si/SiO_2$ multilayer cladding 100 comprising alternating cladding layers of poly-Si ($n_{Si}$=3.5) and $SiO_2$ ($n_{SiO2}$=1.46). The thicknesses of the cladding layers for minimum loss can be 0.22 μm for the first cladding layer 101 of poly-Si, 0.36 μm for the second cladding layer 102 of $SiO_2$ and the interior $SiO_2$ cladding layers 104, and 0.11 μm for the remaining interior poly-Si cladding layers 103. Alternatively, the multilayer dielectric cladding 100 can comprise, for example, alternating layers of poly-Si and SiN ($n_{SiN}$=2.0 at λ=1.55 μm) or SiN and $SiO_2$. For a $SiN/SiO_2$ multilayer cladding 100 comprising SiN as the high-index material, the first cladding layer 101 of SiN can have a thickness of 0.42 μm and the interior SiN cladding layers 103 can have thicknesses of 0.22 μm.

Figure 2A:
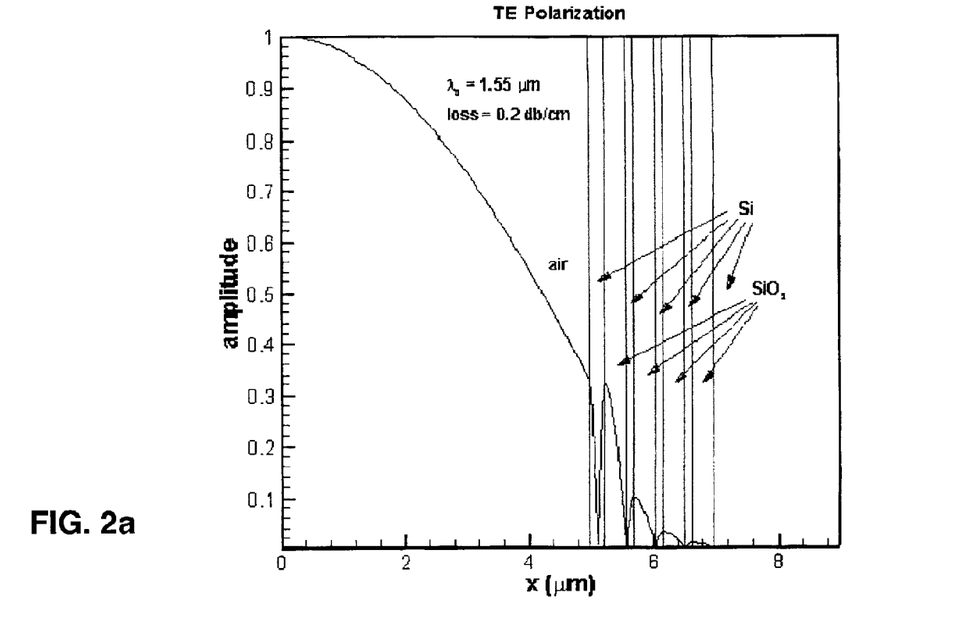
FIG. 2a shows the field distribution for the $TE_1$ mode propagating in a 1D hollow Bragg waveguide with a Si/SiO$_2$ multilayer cladding.

FIG. 2*a* shows the magnetic field amplitude profile calculated using a 1D finite difference model for the $TE_1$ mode of light with wavelength λ=1.55 μm propagating in a 1D Bragg waveguide with a hollow core and the $Si/SiO_2$ multilayer cladding 100 described above. The field dies away within about four cladding layer periods. The calculated attenuation for the $TE_1$ mode in this Bragg waveguide is only 0.2 dB/cm, more than an order of magnitude less than for the silicon-clad hollow waveguide.

Figure 2B:
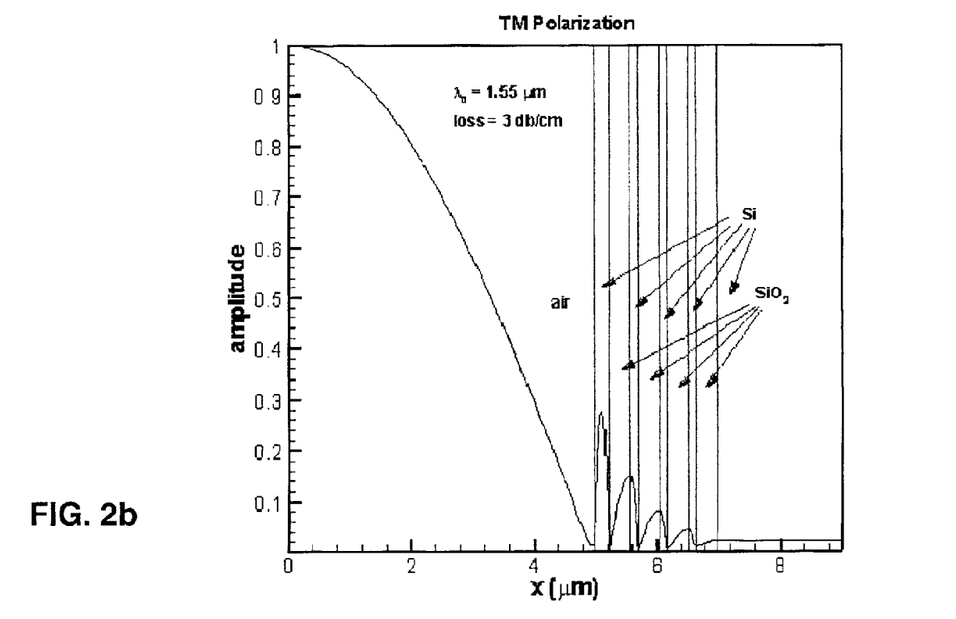
FIG. 2b shows the field distribution for the $TM_1$ mode propagating in a 1D hollow Bragg waveguide with a Si/SiO$_2$ multilayer cladding.

FIG. 2*b* shows a similar field distribution for the $TM_1$ mode. The loss for the $TM_1$ mode is higher, about 3 dB/cm, but still substantially less than with the silicon-clad hollow waveguide. The losses for the $Si/SiO_2$ Bragg waveguide are less than for the silicon-clad hollow waveguide because of the higher reflectivity of the multilayer dielectric cladding 100 and consequent lower optical energy loss to radiation.

The Bragg waveguide of the present invention can be fabricated with integrated circuit technologies. Both channel and fiber waveguides can be fabricated according to the methods of the present invention.

FIG. 3 illustrates a method to fabricate a Bragg channel waveguide 300. The Bragg channel waveguide comprises a trench 318 having a hollow core embedded in a substrate 314, with a multilayer dielectric cladding 100 coated on the inner wall of the trench 318. The Bragg channel waveguide 300 may be useful for guiding light passively in an integrated optical circuit. For example, the Bragg channel waveguide 300 may be of use with passive components such as splitters, combiners, resonators, couplers, and arrayed waveguide gratings.

The method for fabricating the Bragg channel waveguide 300 comprises coating a top surface of a substrate 314 with a mask layer 312 of a structural material, forming an opening 316 in the structural mask layer 312, etching a trench 318 in the substrate 314 through the opening 316 in the structural mask layer 312, and coating the inner wall of the trench 318 with a multilayer dielectric cladding 100. Although the fabrication of a silicon-based Bragg channel waveguide 300 is described, the waveguide can be made of other semiconductor-compatible materials, such as materials based on group III–V and group II–VI compounds.

Figure 3A:
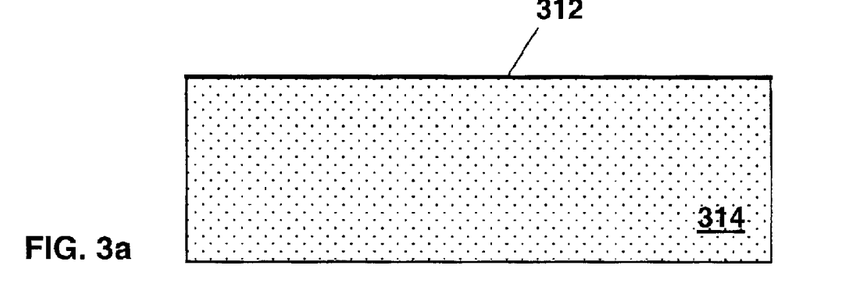
FIG. 3 illustrates a method to fabricate a Bragg channel waveguide using integrated circuit technology.

In FIG. 3*a,* the thin mask layer 312 of the structural material can be deposited on the substrate 314. The substrate 314 can be single crystal silicon. For example, the structural material can be SiN or $SiN/SiO_2$. For example, a SiN mask layer 312 can be deposited by low pressure chemical vapor deposition (LPCVD) from dichlorosilane ($SiCl_2H_2$) and ammonia ($NH_3$) at about 800° C. For example, the structural mask layer 312 can be about 0.8 μm of SiN and 0.6 μm $SiO_2$ of in thickness.

Figure 3B:
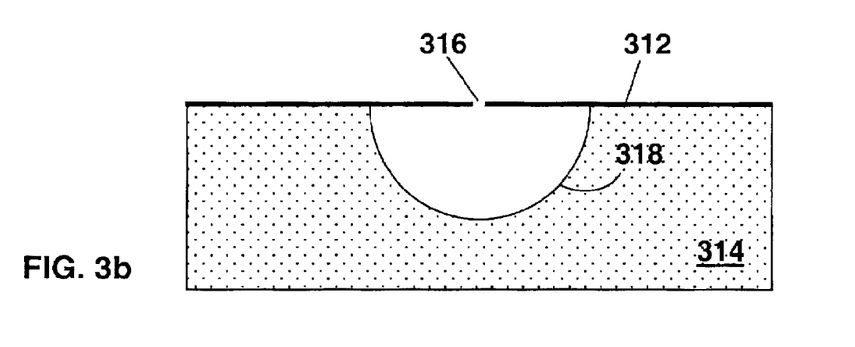

In FIG. 3*b,* a slot 316 can be opened in the structural mask layer 312 by patterned etching. The SiN mask layer 312 can be patterned by reactive ion etching with a $CHF_3$-based plasma through a photoresist. The etch slot 316 can be wide enough to provide for the passage of etchants to form the underlying trench 318. The etch slot 316 can be about 2 $\mu$m wide. The etch slot 316 can be of the length of the trench 318 and can be shaped to provide arbitrary trench configurations. For example, the etch slot 316 can be configured as a "Y" to provide a waveguided optical splitter. The etch slot 316 can have larger inlet openings (not shown) at spaced intervals for the later introduction of gases into the trench 318 to deposit the cladding layers.

The trench 318 can be formed by selective etching of the substrate 314 through the etch slot 316 to form an overhanging mask layer of the structural material. The etch can be an isotropic etch, whereby the structural mask layer 312 is undercut to form a half-cylindrical trench 318. For $SiO_2$ or SiN mask layers 312, isotropic dry plasma etching with a fluorine-based etchant, such as $SF_6$ or $NF_3$, can be used to form the half-cylindrical trench 318 in the silicon substrate 314. Alternatively, trenches 318 with other geometric cross-sections can be formed by appropriate choice of etchant, etch conditions, and substrate. For example, the trench 318 can be made to have parallelogram or triangular cross-section by anisotropic etching. The geometric cross-section can also be made to vary in the propagation direction of the guided optical wave.

Figure 3C:
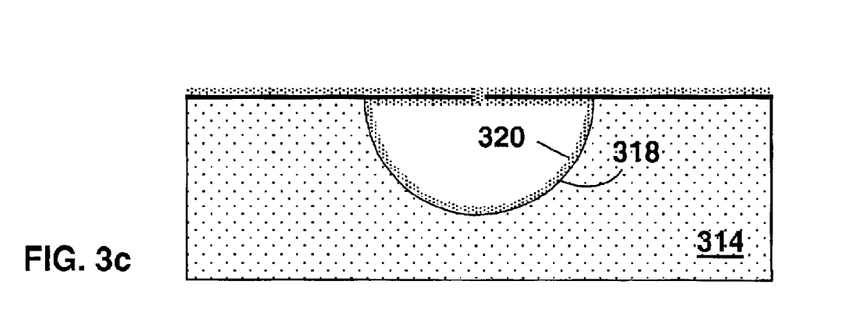

In FIG. 3c, one or more thick layers 320 can be blanket deposited over the masked substrate and in the etch slot 316 to seal off the etch slot 316 to prevent leakage of the guided light from the channel Bragg waveguide 300. The thickness of layer 320 can be slightly greater than one-half of the width of the etch slot 316, or about 1–2 $\mu$m. The thick layer 320 can be poly-Si deposited by CVD. A layer of thermal oxide (not shown) can be grown on the poly-Si layer 320 to smooth the sidewalls of the trench 318.

Figure 3D:
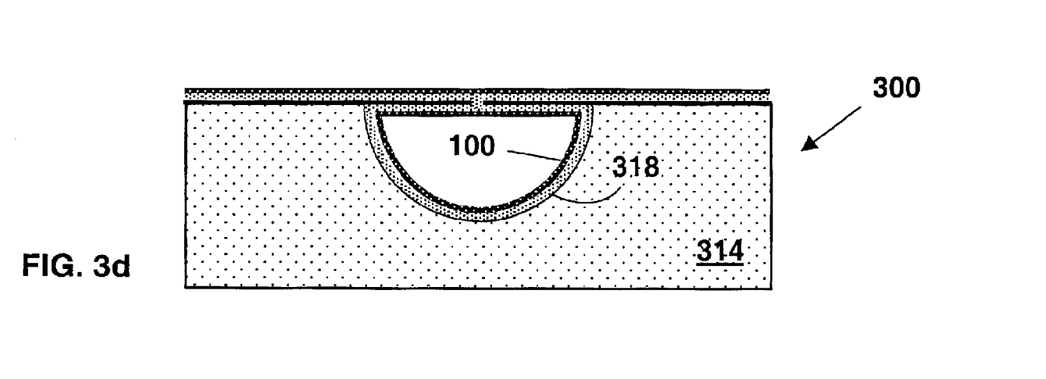

In FIG. 3d, the multilayer dielectric cladding 100 can be built up from the thick layer 320 on the inner wall of the trench 318 by alternating successive depositions of the concentric cladding layers to form the channel Bragg waveguide 300. The reactant and carrier gases for chemical vapor deposition of the multilayer dielectric cladding 100 can be introduced into the trench 318 through the spaced gas inlets (not shown). The spacing of the gas inlets can be chosen to provide for uniform conformal coverage of the multilayer dielectric cladding 100 throughout the length of the sealed trench 318. Since the multilayer dielectric cladding 100 is built up from the inner wall of the trench 318, only one cladding layer is added for each process step.

For example, the multilayer dielectric cladding 100 can comprise alternating layers of high-refractive-index poly-Si and low-index SiN. Alternatively, the multilayer dielectric cladding structure 100 can comprise $Si/SiO_2$, $SiN/SiO_2$, or other combinations of silicon-based materials. The cladding layer thicknesses can be chosen to satisfy the condition for minimum radiation loss at the wavelength of the guided optical wave. Therefore, for a guided optical wave of 1.55 mm wavelength in a Si/SiN waveguide, the poly-Si first cladding layer 101 can have a thickness of about 0.22 $\mu$m, the poly-Si interior cladding layers 103 can have thicknesses of about 0.11 $\mu$m, and the lower index SiN cladding layers 102, 104 can have thicknesses of about 0.22 $\mu$m. Bragg waveguides for guided waves having alternative wavelengths can be fabricated by depositing a multilayer dielectric cladding 100 with cladding layer thicknesses satisfying the condition for minimum radiation loss at that desired wavelength. Cladding layers from about 10 nm to 1 $\mu$m thickness can be deposited by the above method, enabling guided light of a wide range of optical wavelengths.

Poly-Si can be deposited by LPCVD from silane ($SiH_4$) at 550° C. Poly-Si is highly conformal, so that the spacing of the gas inlets can be large. SiN can be deposited by LPCVD from $SiCl_2H_2$ and $NH_3$, and is also highly conformal, but can have high stress. The high stress can limit the SiN layer thickness. CVD $SiO_2$ has poorer step coverage than poly-Si, necessitating a closer spacing of the gas inlets for a conformal coating of $SiO_2$ along the length of the trench 318. For some applications, better step coverage may be preferred. For these applications, the $SiO_2$ layer can be grown by depositing an excess of poly-Si, followed by partial thermal wet oxidation of the poly-Si layer by reaction with oxygen in a moist environment at high temperature. For example, for the relatively uniform CVD of $SiO_2$ within a 10 $\mu$m diameter trench 318, the gas inlets can be spaced about 400–1600 $\mu$m apart, depending on the deposition materials and conditions.

Alternatively, the Bragg waveguide can be a hollow fiber. The Bragg fiber comprises a free-standing fiber, having a hollow core, coated with a multilayer dielectric cladding 100 on the inner and/or outer wall of the hollow fiber.

The method for fabricating a Bragg fiber comprises forming a mold or mandrel of a sacrificial material, coating the mold or mandrel with a multilayer dielectric cladding 100, and removing the sacrificial material to leave a free-standing hollow tube of the multilayer dielectric cladding 100. Although the fabrication of a silicon-based Bragg fiber for 1.55 $\mu$m wavelength light is described below, the fiber can be made of other semiconductor-compatible materials, such as materials based on group III–V and group II–VI compounds. Also, the multilayer dielectric cladding 100 can be constructed to guide light of other wavelengths.

FIG. 4 illustrates an exemplary method for fabricating a Bragg fiber 400 wherein the multilayer dielectric cladding 100 is deposited on the exterior surface of a sacrificial mandrel 412 and the mandrel 412 is subsequently removed by selective etching to leave the Bragg fiber 400 having a hollow core. The sacrificial mandrel 412 can comprise a suspended structure, or beam, fabricated by techniques known to those in the MEMS art.

Figure 4A:
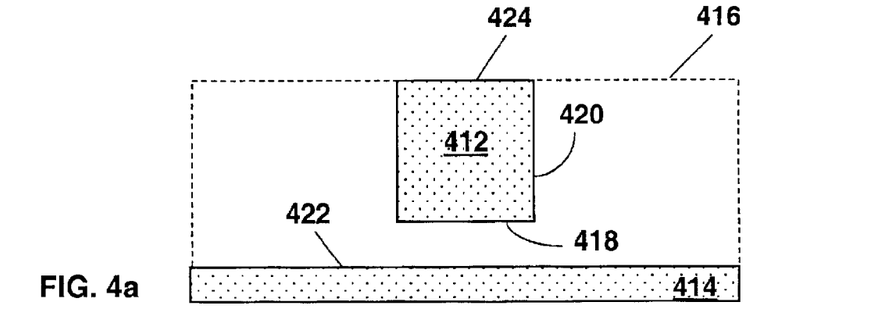
FIG. 4 illustrates a method to fabricate a Bragg fiber using a sacrificial mandrel.

In FIG. 4a is shown a beam 412 suspended from a substrate 414. For example, a rectangular beam 412 can be formed from {111} crystalline silicon by bulk micromachining methods as disclosed in U.S. Pat. No. 6,020,272 to Fleming, which is incorporated herein by reference. The micromachining method disclosed by Fleming comprises forming a patterned mask layer (not shown) on the major surface 416 of the {111} silicon substrate followed by anisotropic dry etching down the silicon substrate through the patterned mask layer to a first etch depth that defines the bottom 418 of the beam 412. A protective layer (not shown) is then deposited on the sidewalls 420 of the beam 412 exposed by the etching. The anisotropic etching is then continued down to a second etch depth that defines the remaining portion 422 of the top surface of the substrate 414. The substrate 414 is then lateral undercut between the first and second etch depths with an anisotropic wet etchant that terminates etching upon reaching a plurality of {111} crystal planes of the silicon substrate 414, thereby forming a substantially planar bottom surface 418 that is substantially parallel to the upper surface 424 of the beam 412. After the undercutting etch step, the patterned mask layer and the protection layer can be removed. The beam 412 can be suspended from the substrate 414 by a pedestal (not shown).

Figure 4B:
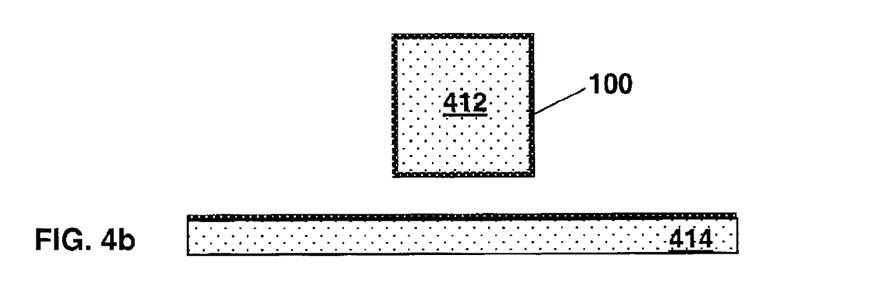

In FIG. 4b, the multilayer dielectric cladding 100 can be built up from the exterior surfaces 418, 420, 424 of the suspended beam 412 by alternating successive depositions of the concentric cladding layers. The multilayer dielectric cladding 100 can comprise the same silicon-based dielectric materials as those described above for the Bragg channel waveguide 300.

Figure 4C:
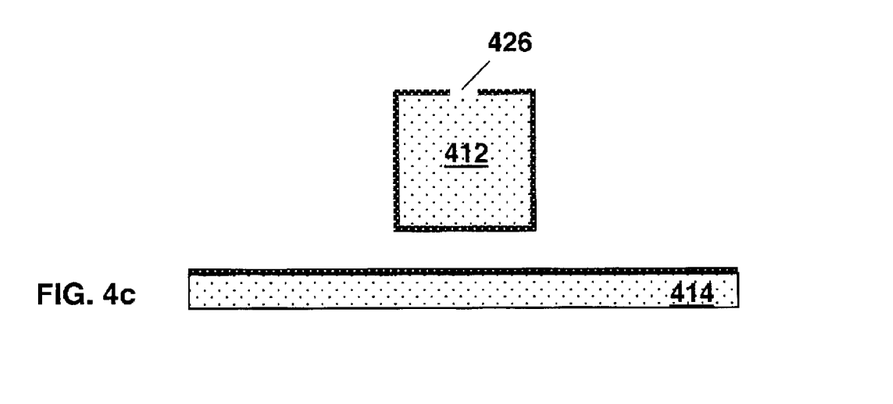

In FIG. 4c, a plurality of holes 426 can be opened in the multilayer dielectric cladding 100 by patterned etching through the cladding layers down to the suspended beam 412. The holes 426 can be spaced widely to inhibit leakage of the guided light, yet close enough to provide an adequate etch rate for the sacrificial beam material.

Figure 4D:
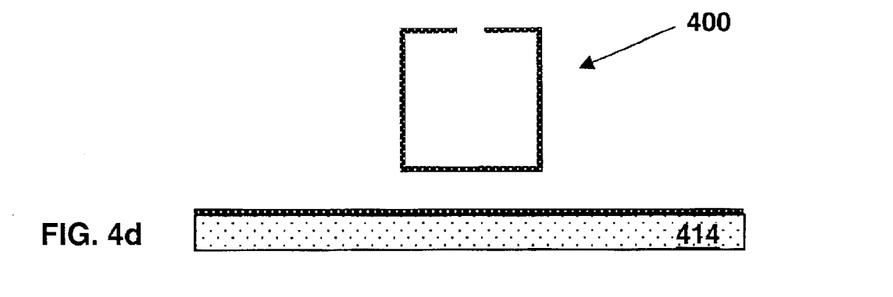

In FIG. 4d, the beam 412 can be removed by selective etching of the sacrificial material through the plurality of holes 426 to leave the free-standing Bragg fiber 400.

FIG. 5 illustrates an exemplary method for fabricating a Bragg fiber 500 using a sacrificial mold. With this method, the Bragg fiber is built up from the interior surface of the hollow mold. A structural hollow tube 528 can formed on the interior surface of a mold-forming trench 512 in a substrate 514. The substrate 514 can be removed from the tube 528 and the multilayer dielectric cladding 100 can then be deposited on the inner and/or outer wall of the tube 528.

Figure 5A:
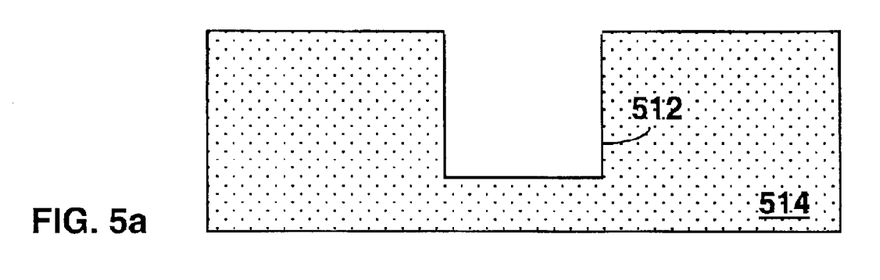
FIG. 5 illustrates a method to fabricate a Bragg fiber using a sacrificial mold.

In FIG. 5a, the trench 512 can first be formed in the substrate 514. The trench 512 can be rectangular or alternative geometric cross-section, depending on the etching process used and the substrate material. The substrate 514 can be single crystal silicon, gallium arsenide, or other suitable mold-forming material. The trench 512 can be formed by wet or dry chemical etching of the substrate 514. For example, a rectangular trench 512 can be formed by reactive ion etching.

Figure 5B:
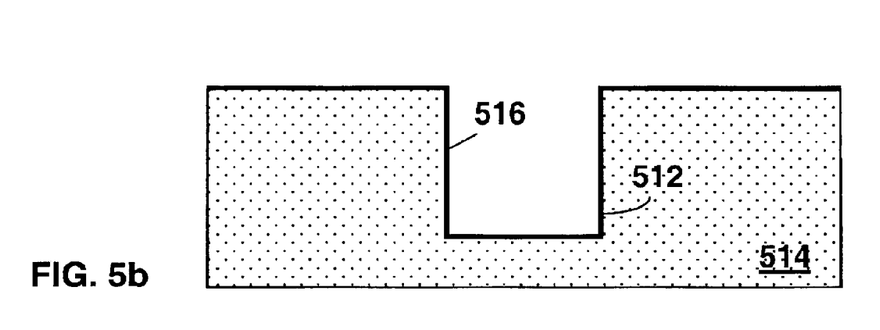

In FIG. 5b, the trench 512 can be lined with a thin layer 516 of a structural material which can form the bottom and sidewalls of the tube 528. The structural material can preferably be SiN. SiN has superior chemical and mechanical properties, has highly selective etch rates over $SiO_2$ and Si in many etchants, and can be deposited by CVD. SiN also has excellent step coverage for conformal coating of the trench 512. The thickness of the structural layer 516 can be chosen to satisfy the condition for minimum radiation loss. For example, the SiN layer thickness can be about 0.22 $\mu$m for a guided optical wave of 1.55 $\mu$m wavelength.

Figure 5C:
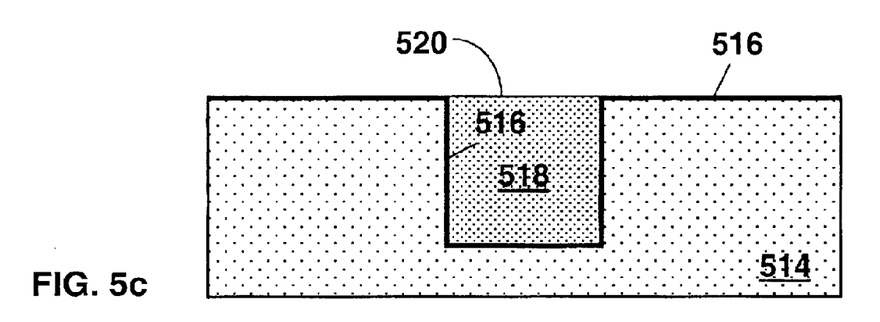

In FIG. 5c, the structural material-lined trench 512 can be backfilled with a sacrificial material 518 to provide a deposit surface 520 for subsequent deposition of a top wall of the tube 528. The sacrificial material 518 can be is polysilicon, deposited from silane by LPCVD. The deposit surface 520 of the sacrificial material 518 can be planarized back to the structural layer 516 by chemical mechanical polishing or other suitable planarizing method.

Figure 5D:
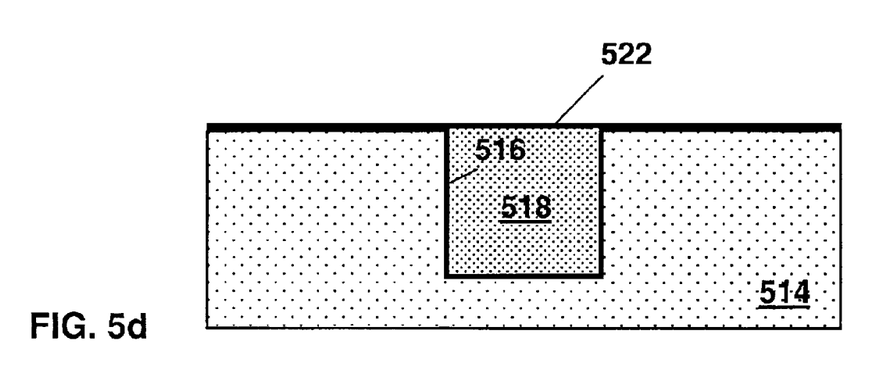

In FIG. 5d, a top layer 522 of a structural material can then be blanket deposited on the deposit surface 520 and the exposed portion of the structural layer 516. The portion of the top layer 522 covering the deposit surface 520 will form the top wall of the tube 528. The structural material and the thickness of the top-wall-forming layer 522 are preferably the same as the bottom- and sidewall-forming layer 516 lining the trench 512. Thus, the top layer 522 can be SiN having the same thickness as the SiN bottom and sidewall layers (e.g., about 0.22 $\mu$m).

Figure 5E:
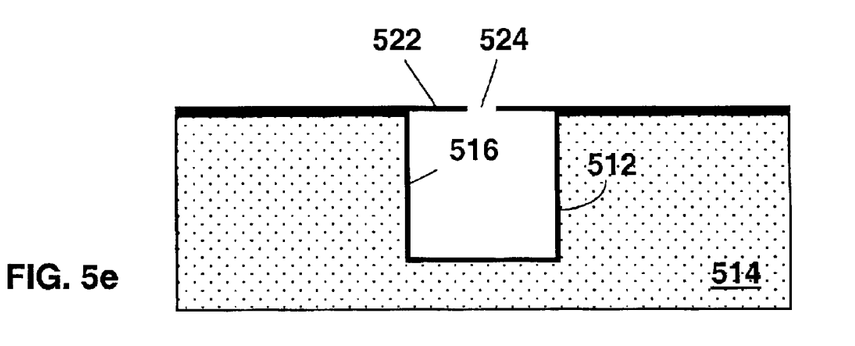

In FIG. 5e, a plurality of spaced etch holes 524 can then be opened in the top layer 522 overlying the deposit surface 520 by patterned etching to expose the underlying sacrificial material 518. The sacrificial material 518 can then be removed from the structural material-lined trench 512 by selective etching through the holes 524. For example, poly-Si sacrificial material 518 can be removed from a SiN-lined trench 512 with a highly selective potassium hydroxide (KOH) or tetramethylammonium hydroxide (TMAH) etch.

Figure 5F:
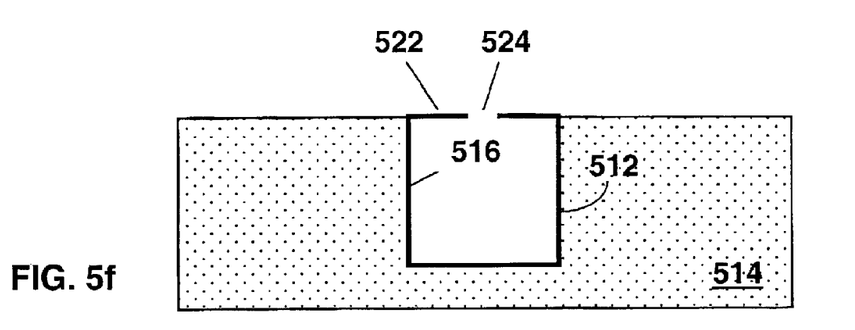

In FIG. 5f, the structural top layer 522 can then be patterned down to the substrate 514 to leave the portion of the top layer that forms the top wall of the tube 528.

Figure 5G:
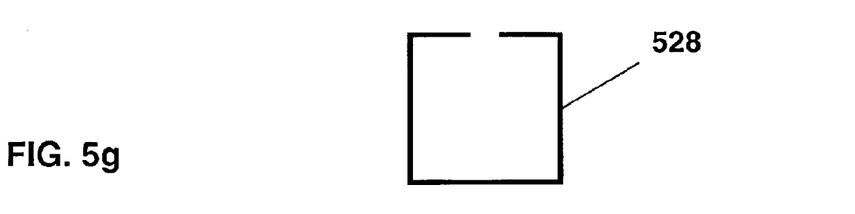

In FIG. 5g, the substrate 514 surrounding the structural layer 516 can then be removed to leave a hollow tube 528 of the structural material. For example, a silicon substrate 514 can be removed from a SiN tube 528 using a mostly isotropic fluorine-based etch (alternatively, a KOH etch can be used).

Figure 5H:
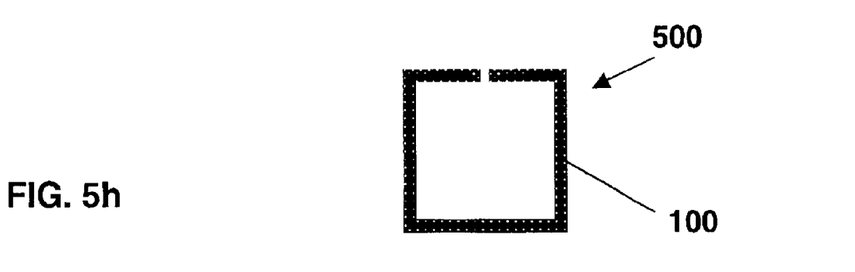

In FIG. 5h, the rest of the multilayer dielectric cladding 100 can then be built up by depositing alternating concentric layers of the dielectric cladding materials on the tube 528 to form the Bragg fiber 500. The alternating cladding layers can have thicknesses that satisfy the condition for minimum radiation loss. The alternating cladding layers can be deposited symmetrically both on the outer wall of the tube 528 and on the inner wall, through the spaced holes 524, so that two cladding layers of the same dielectric material can be deposited in a single process step.

The free-standing Bragg fiber may be preferred for optical switching applications wherein movement of the waveguide can be desirable. An actuation layer (not shown) can be deposited on the outside of the Bragg fiber 400, 500 to provide for actuated movement thereof. The actuation layer can be a thin layer of Al or other metal deposited by e-beam processes on the top of the top wall of the Bragg fiber 400, 500.

For integrated microphotonics applications, interconnection of optical components can be an important packaging issue. A reflective coupler is commonly used to couple light into or out of an optical waveguide or fiber. Light can be coupled into the Bragg waveguide 300, 400, 500 either from the side or from the top. Top coupling can be achieved, for example, by using a 45 degree mirror to reflect light from a direction perpendicular to the propagation axis into the axis of the waveguide. The 45 degree mirror can be fabricated using a wet oxide process whereby a thin, fast-etching oxide is deposited over a slow-etching oxide. When such mixed-oxide structures are patterned and etched a stable straight slope can be achieved. The slope depends on the ratio of the etch rates of the oxides. Top coupling may improve the density of waveguide packing. Alternatively, moveable micromirrors can be fabricated by MEMS technologies to actively control light coupling into the waveguide.

Figure 6A:
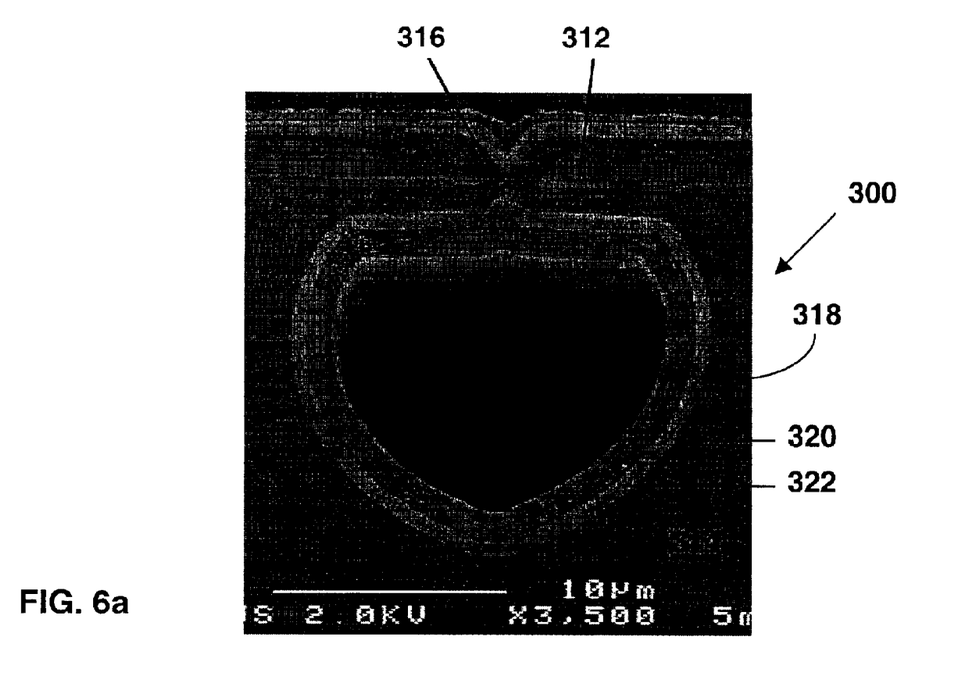
FIG. 6a shows a low magnification SEM of the Bragg channel waveguide.

FIG. 6a shows a scanning electron micrograph of a microfabricated Bragg channel waveguide 300, comprising a Si/SiN multilayer cladding 100. The approximately half-cylindrical, 15 $\mu$m diameter trench 318 was formed by isotropic reactive ion etching of a silicon substrate 314 through a 2 $\mu$m wide etch slot 316 in a SiN/$SiO_2$ structure mask layer 312. A thick (about 2 $\mu$m thickness) layer 320 of poly-Si was deposited in the etched trench 318 to seal the etch slot 316. A 1 $\mu$m thick layer of thermal oxide 322 was grown on the poly-Si layer to smooth the sidewalls of the trench 318. A Si/SIN multilayer cladding 100 was formed by CVD of the Si and SiN cladding layers on the inner wall of the trench 316 through spaced gas inlets (not shown).

Figure 6B:
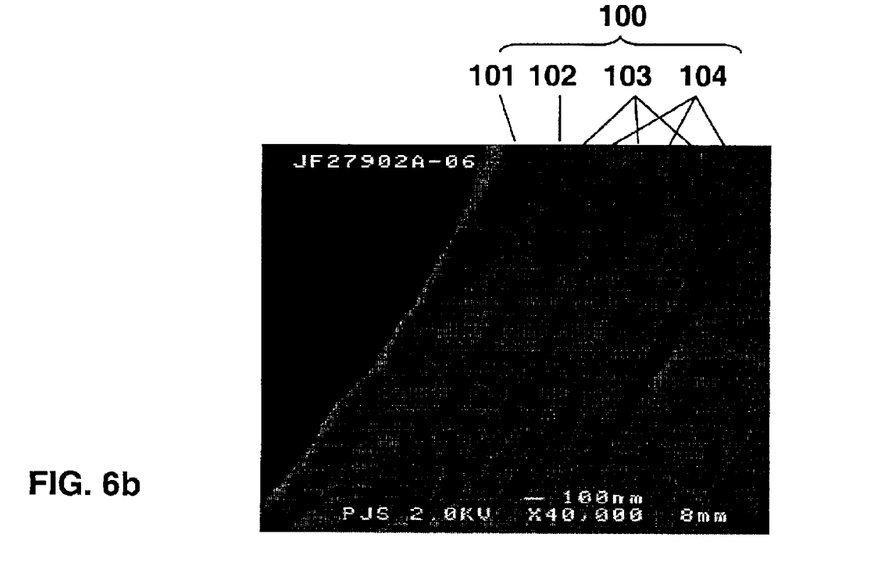
FIG. 6b shows a high magnification SEM of the multilayer dielectric cladding structure of the Bragg channel waveguide.

FIG. 6b shows the microstructure of the Si/SiN multilayer dielectric cladding 100, comprising alternating thin cladding layers of poly-Si and SiN. The thicknesses of the cladding layers were chosen to minimize the radiation loss for guided light of 1.55 $\mu$m wavelength. The thickness of the inner-most first cladding layer 101 of poly-Si is about 0.22 $\mu$m. The remaining interior poly-Si cladding layers 103 are about 0.11 $\mu$m in thickness. The SiN cladding layers 102, 104 are about 0.22 $\mu$m in thickness.

Figure 7:
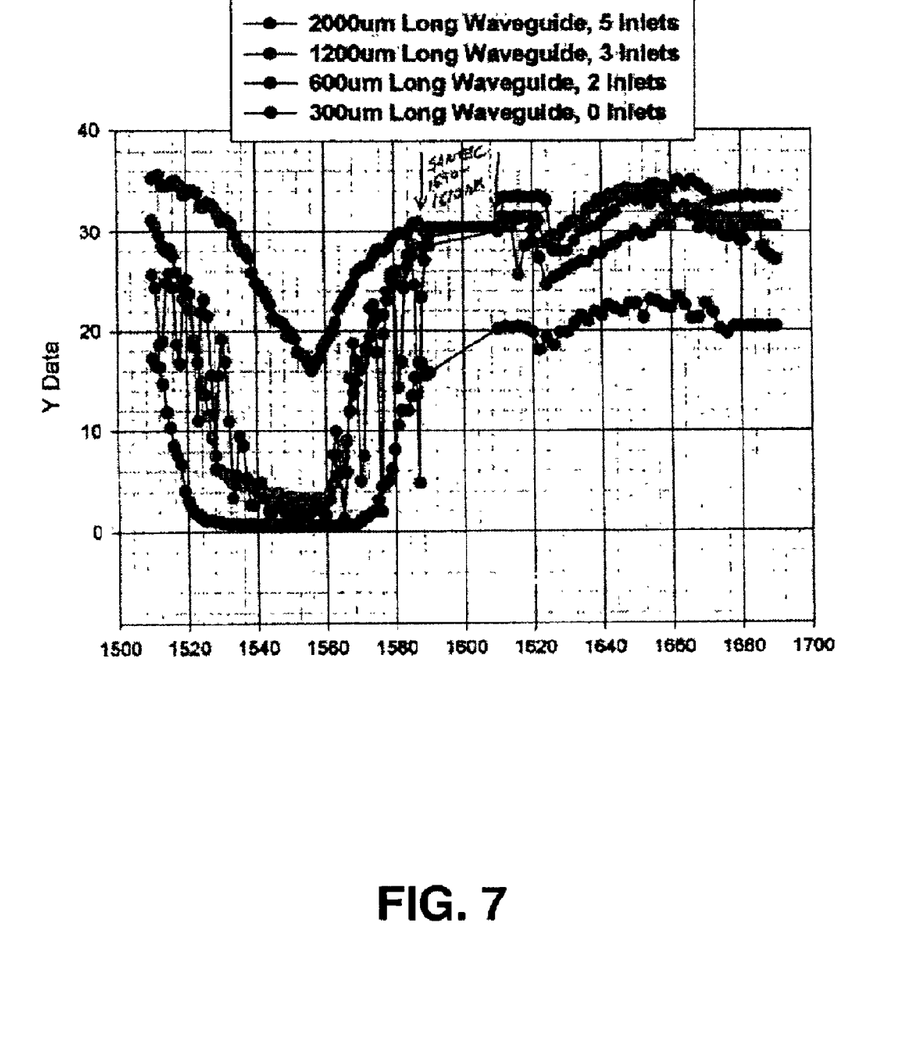
FIG. 7 shows a graph of transmission spectra for Bragg channel waveguides having a Si/SiN multilayer cladding constructed to a guide light with a wavelength of 1.65 µm.

FIG. 7 shows transmission spectra for Bragg channel waveguides 300 having Si/SiN multilayer claddings 100.

The shortest waveguide, having a length of 300 µm, shows good transmission for guided waves having wavelengths of about 1.58 µm to in excess of 1.69 µm, indicating high reflectivity of the Si/SiN multilayer cladding 100 for this bandwidth. As expected, optical transmission decreases in longer waveguides. From these transmission spectra, the attenuation of this unoptimized Bragg channel waveguide at 1.65 µm wavelength was calculated to be about 8 dB/cm. Attenuations approaching the theoretical values have been obtained for Bragg waveguides fabricated using the above-described methods and materials for guided optical waves having a range of wavelengths.

The embodiments of the present invention have been described as microfabricated Bragg waveguides and methods for fabricating the Bragg waveguides either as a hollow channel waveguide or as a hollow fiber. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A microfabricated Bragg channel waveguide of semiconductor-compatible materials, comprising:
   a closed trench having an annular hollow core of arbitrary cross-section embedded in a substrate for the propagation of an optical wave therein, and
   a continuous multilayer dielectric cladding deposited conformably on the inner wall of the annular hollow core, the cladding comprising at least one alternating layer of a first dielectric material having a high index of refraction and a second dielectric material having a lower index of refraction, such that the thicknesses of the alternating layers satisfy the condition for minimum radiation loss at the wavelength of the optical wave.

2. The microfabricated Bragg channel waveguide of claim 1, wherein the semiconductor-compatible materials comprise silicon-based materials.

3. The microfabricated Bragg channel waveguide of claim 2, wherein the silicon-based materials comprise single crystal silicon, polysilicon, silicon dioxide, silicon nitride, silicon oxynitride, or silicon carbide.

4. The microfabricated Bragg channel waveguide of claim 1, wherein the semiconductor-compatible materials comprise group II–VI or group III–V compound-based materials.

5. The microfabricated Bragg channel waveguide of claim 1, wherein the annular hollow core has a cross-section of dimension less than 1 millimeter.

6. The microfabricated Bragg channel waveguide of claim 1, wherein the annular hollow core has a cross-section of dimension less than 200 micrometers.

7. The microfabricated Bragg channel waveguide of claim 1, wherein the thickness of the first cladding layer is less than 1 micrometer.

8. The microfabricated Bragg channel waveguide of claim 1, wherein the thickness of the first cladding layer is less than 0.1 micrometers.

9. The microfabricated Bragg channel waveguide of claim 1, wherein the at least one alternating layer comprises less than five alternating layer periods.

10. The microfabricated Bragg channel waveguide of claim 1, wherein the annular hollow core is filled with a material having an index of refraction less than the index of refraction of the first dielectric material.

11. The microfabricated Bragg channel waveguide of claim 1, wherein the annular hollow core is filled with a material having an index of refraction greater than the index of refraction of the first dielectric material.

12. A microfabricated Bragg fiber of semiconductor-compatible materials, comprising:
    a tube having an annular hollow core of arbitrary cross-section for the propagation of an optical wave therein, and
    a continuous multilayer dielectric cladding deposited conformably on the inner wall of the annular hollow core, the cladding comprising at least one alternating layer of a first dielectric material having a high index of refraction and a second dielectric material having a lower index of refraction, such that the thicknesses of the alternating layers satisfy the condition for minimum radiation loss at the wavelength of the optical wave.

13. The microfabricated Bragg fiber of claim 12, wherein the semiconductor-compatible materials comprise silicon-based materials.

14. The microfabricated Bragg fiber of claim 13, wherein the silicon-based materials comprise single crystal silicon, polysilicon, silicon dioxide, silicon nitride, silicon oxynitride, or silicon carbide.

15. The microfabricated Bragg fiber of claim 12, wherein the semiconductor-compatible materials comprise group II–VI or group II–V compound-based materials.

16. The microfabricated Bragg fiber of claim 12, wherein the tube has wall thickness less than 1 micrometer.

17. The microfabricated Bragg fiber of claim 12, wherein the annular hollow core has a cross-section of dimension less than 1 millimeter.

18. The microfabricated Bragg fiber of claim 12, wherein the annular hollow core has a cross-section of dimension less than 200 micrometers.

19. The micorfabricated Bragg fiber of claim 12, wherein the thickness of the first cladding layer is less than 1 micrometer.

20. The microfabricated Bragg fiber of claim 12, wherein the thickness of the first cladding layer is less than 0.1 micrometers.

21. The microfabricated Bragg fiber of claim 12, wherein the at least one alternating layer comprises less than five alternating layer periods.

22. The microfabricated Bragg fiber of claim 12, wherein the annular hollow core is filled with a material having an index of refraction less than the index of refraction of the first dielectric material.

23. The microfabricated Bragg fiber of claim 12, wherein the annular hollow core is filled with a material having an index of refraction greater than the index of refraction of the first dielectric material.

24. The microfabricated Bragg channel waveguide of claim 1, wherein the optical wave comprises linear polarized light.

25. The microfabricated Bragg channel waveguide of claim 24, wherein the first cladding layer of the multilayer dielectric cladding is slightly below a half-wave thickness.

26. The microfabricated Bragg fiber of claim 12, wherein the optical wave comprises linear polarized light.

27. The microfabricated Bragg fiber of claim 26, wherein the first cladding layer of the multilayer dielectric cladding is slightly below a half-wave thickness.

28. A Bragg waveguide, comprising:
    an annular hollow core of arbitrary cross-section for the propagation therein of an optical wave comprising linearly polarized light,
    a multilayer dielectric cladding on the inner wall of the annular hollow core, the cladding comprising at least one alternating layer of a first dielectric material having a high index of refraction and a second dielectric material having a lower index of refraction, such that the thicknesses of the alternating layers satisfy the condition for minimum radiation loss for propagating the optical wave in the annular hollow core.

29. The Bragg waveguide of claim 28, wherein the first cladding layer of first dielectric material of the multilayer dielectric cladding is approximately half-wave thickness.

30. The Bragg waveguide of claim 29, wherein the first cladding layer of first dielectric material of the multilayer dielectric cladding is slightly below a half-wave thickness.

31. The Bragg waveguide of claim 28, wherein the second cladding layer of second dielectric material of the multilayer dielectric cladding is approximately quarter-wave thickness.

32. The Bragg waveguide of claim 28, wherein the annular hollow core has a cross-section of dimension less than 1 millimeter.

33. The Bragg waveguide of claim 28, wherein the annular hollow core has a cross-section of dimension less than 200 micrometers.

34. The Bragg waveguide of claim 28, wherein the thickness of the first cladding layer is less than 1 micrometer.

35. The Bragg waveguide of claim 28, wherein the thickness of the first cladding layer is less than 0.1 micrometers.

36. The Bragg waveguide of claim 28, wherein the first and second dielectric materials comprise silicon-based materials.

37. The Bragg waveguide of claim 36, wherein the silicon-based materials comprise single crystal silicon, polysilicon, silicon dioxide, silicon nitride, silicon, oxynitride, or silicon carbide.

* * * * *